United States Patent
Uenodan et al.

(10) Patent No.: US 11,821,780 B2
(45) Date of Patent: Nov. 21, 2023

(54) FLOW RATE MEASUREMENT DEVICE

(71) Applicant: Hitachi Astemo, Ltd., Hitachinaka (JP)

(72) Inventors: Akira Uenodan, Hitachinaka (JP);
Nobuaki Gorai, Hitachinaka (JP);
Shigeto Hirohata, Hitachinaka (JP);
Naoki Saito, Hitachinaka (JP);
Takahiro Miki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 32 days.

(21) Appl. No.: 17/595,331

(22) PCT Filed: Jun. 9, 2020

(86) PCT No.: PCT/JP2020/022621
§ 371 (c)(1),
(2) Date: Nov. 15, 2021

(87) PCT Pub. No.: WO2020/250870
PCT Pub. Date: Dec. 17, 2020

(65) Prior Publication Data
US 2022/0214198 A1  Jul. 7, 2022

(30) Foreign Application Priority Data

Jun. 13, 2019  (JP) .................. 2019-110049

(51) Int. Cl.
*G01F 5/00*       (2006.01)
*G01F 1/684*     (2006.01)
*G01F 15/14*     (2006.01)

(52) U.S. Cl.
CPC .............. *G01F 5/00* (2013.01); *G01F 1/6842* (2013.01); *G01F 1/6845* (2013.01); *G01F 15/14* (2013.01)

(58) Field of Classification Search
CPC ... G01F 5/00; G01F 1/68; G01F 1/684; G01F 1/6842; G01F 1/6845; G01F 1/692; G01F 15/14
See application file for complete search history.

(56) References Cited

U.S. PATENT DOCUMENTS 6,516,785 B1 *  2/2003  Nakada .................... G01F 5/00
                                                              73/114.34
7,437,927 B2 *  10/2008  Yamada ................ G01F 1/6845
                                                              73/204.21
(Continued)

FOREIGN PATENT DOCUMENTS

JP   2002-168669 A       6/2002
JP   2014071032 A  *     4/2014
WO   WO 2019/049513 A1   3/2019

OTHER PUBLICATIONS

International Search Report (PCT/ISA/210) issued in PCT Application No. PCT/JP2020/022621 dated Aug. 25, 2020 with English translation (four (4) pages).

(Continued)

*Primary Examiner* — Justin N Olamit
(74) *Attorney, Agent, or Firm* — Crowell & Moring LLP

(57) ABSTRACT

An object is to improve measurement accuracy of a flow rate measurement device. A flow rate measurement device including: a first void which is formed of one surface of the support body and one surface of the circuit board; a second void which is formed of a surface opposite to the one surface of the circuit board and the housing; and a third void which is formed of a surface opposite to the one surface of the support body and a cover.

11 Claims, 8 Drawing Sheets

(56) References Cited

U.S. PATENT DOCUMENTS

| | | | |
|---|---|---|---|
| 2017/0268916 A1* | 9/2017 | Miki | G01M 15/042 |
| 2018/0158743 A1* | 6/2018 | Watanabe | B29C 45/14639 |
| 2021/0148743 A1 | 5/2021 | Uenodan et al. | |

OTHER PUBLICATIONS

Japanese-language Written Opinion (PCT/ISA/237) issued in PCT Application No. PCT/JP2020/022621 dated Aug. 25, 2020 (three (3) pages).

* cited by examiner

FLOW RATE MEASUREMENT DEVICE

TECHNICAL FIELD

The present invention relates to a flow rate measurement device that measures a flow rate of a gas to be measured.

BACKGROUND ART

The technique of PTL 1 is disclosed as an example of the flow rate measurement device.

CITATION LIST

Patent Literature

PTL 1: WO 2019/049513

SUMMARY OF INVENTION

Technical Problem

A flow rate measurement device has a structure in which the flow is divided into a flow path (hereinafter, referred to as D1) in which a measurement surface of a flow rate measurement element is disposed and a flow path (hereinafter, referred to as D2) in which the measurement surface is not disposed in a sub-passage. In PTL 1, reducing dimensional variations of D1 has studied, but reducing dimensional variations of D2 is not disclosed. As a result of intensive studies by the present inventors, it has been found that the measurement accuracy of the flow rate measurement device is affected by a flow dividing ratio between D1 and D2 in addition to the dimension of D1. In PTL 1, there is room for study on reducing the variation in the flow dividing ratio.

An object of the present invention is to provide an accurate flow rate measurement device.

Solution to Problem

In order to achieve the above object, a flow rate measurement device of the present invention includes: a circuit board which is mounted on a housing, and a part of which is disposed in a sub-passage; a support body which is mounted on the circuit board, and a part of which is disposed in the sub-passage; a flow rate measurement element which is mounted on the support body, and of which a measurement surface is disposed in the sub-passage; a first void which is formed of one surface of the support body and one surface of the circuit board in which the flow rate measuring element is disposed on the one surface side of the support body so as to face one surface side of a part on which the measurement surface of the flow rate measurement element is disposed in the sub-passage of the circuit board; a second void which is formed of a surface opposite to the one surface of the circuit board and the housing; and a third void which is formed of a surface opposite to the one surface of the support body and a cover.

Advantageous Effects of Invention

According to the present invention, it is possible to provide an accurate flow rate measurement device.

DESCRIPTION OF EMBODIMENTS

Hereinafter, embodiments of the present invention will be described with reference to the drawings.

First Embodiment

A first embodiment of a flow rate measurement device will be described with reference to FIGS. 1 to 6.

Figure 1:
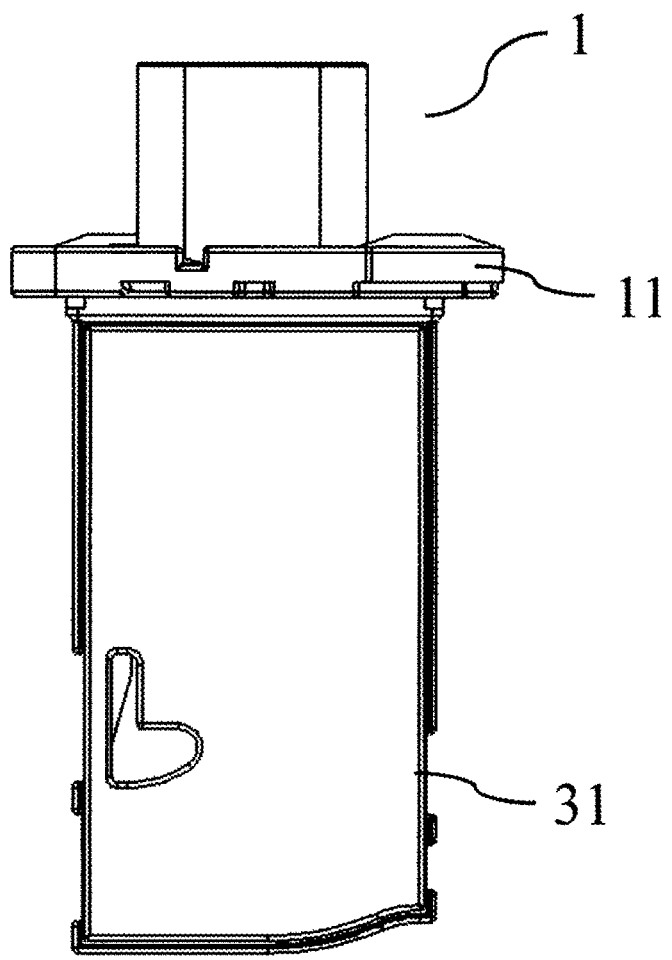
FIG. 1 is a plan view of a flow rate measurement device according to a first embodiment of the present invention.
Figure 2:
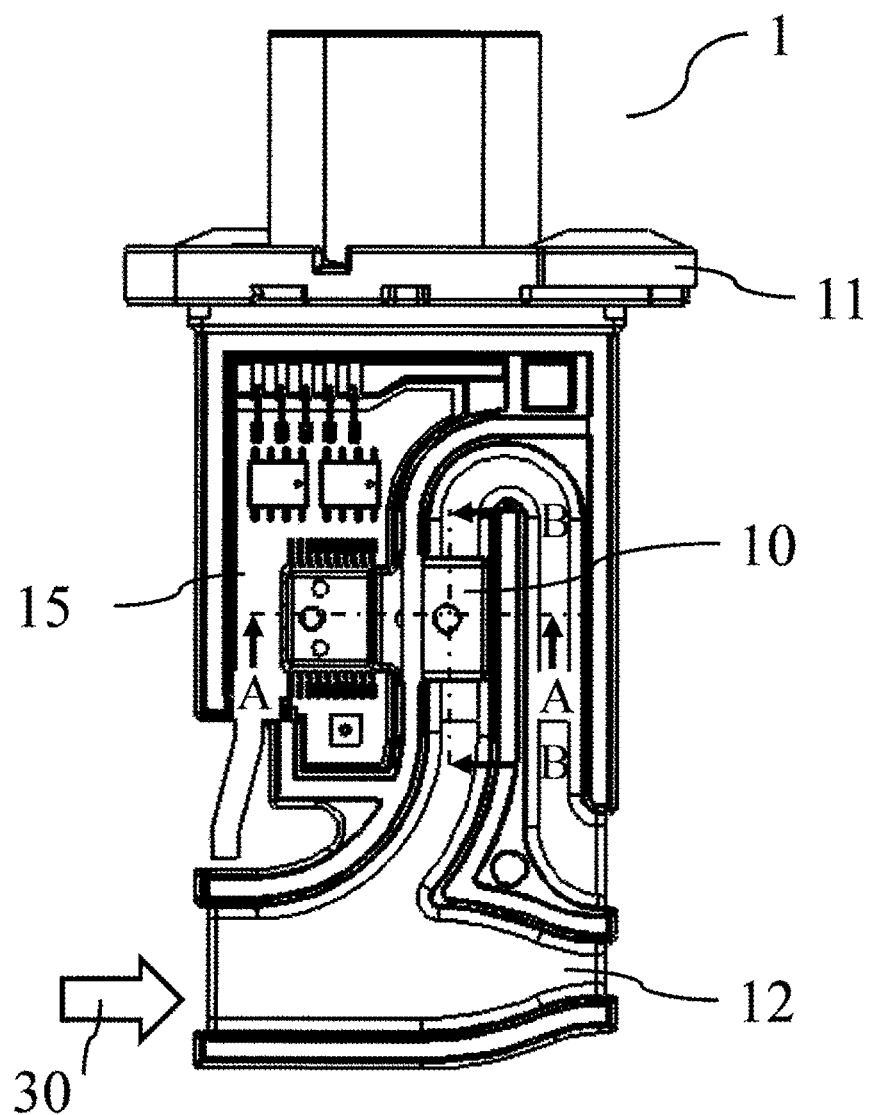
FIG. 2 is a plan view of the flow rate measurement device according to the first embodiment of the present invention before attachment of a cover.

As illustrated in FIGS. 1 and 2, the flow rate measurement device 1 in the present embodiment includes a housing 11 constituting a part of a sub-passage 12, a cover 31, a circuit board 15 mounted on the housing 11, and a sensor assembly 10 mounted on the circuit board 15. The cover 31 and the housing 11 are fixed by, for example, an adhesive 17. The housing 11 is formed with a sub-passage groove for forming the sub-passage 12, and forms the sub-passage 12 for taking in a part of air 30 which is a medium to be measured in cooperation with the cover 31. The sub-passage groove may be formed in the cover 31 and the sub-passage groove may not be formed in the housing 11, or the sub-passage groove may be formed in both the cover 31 and the housing 11.

Figure 3:
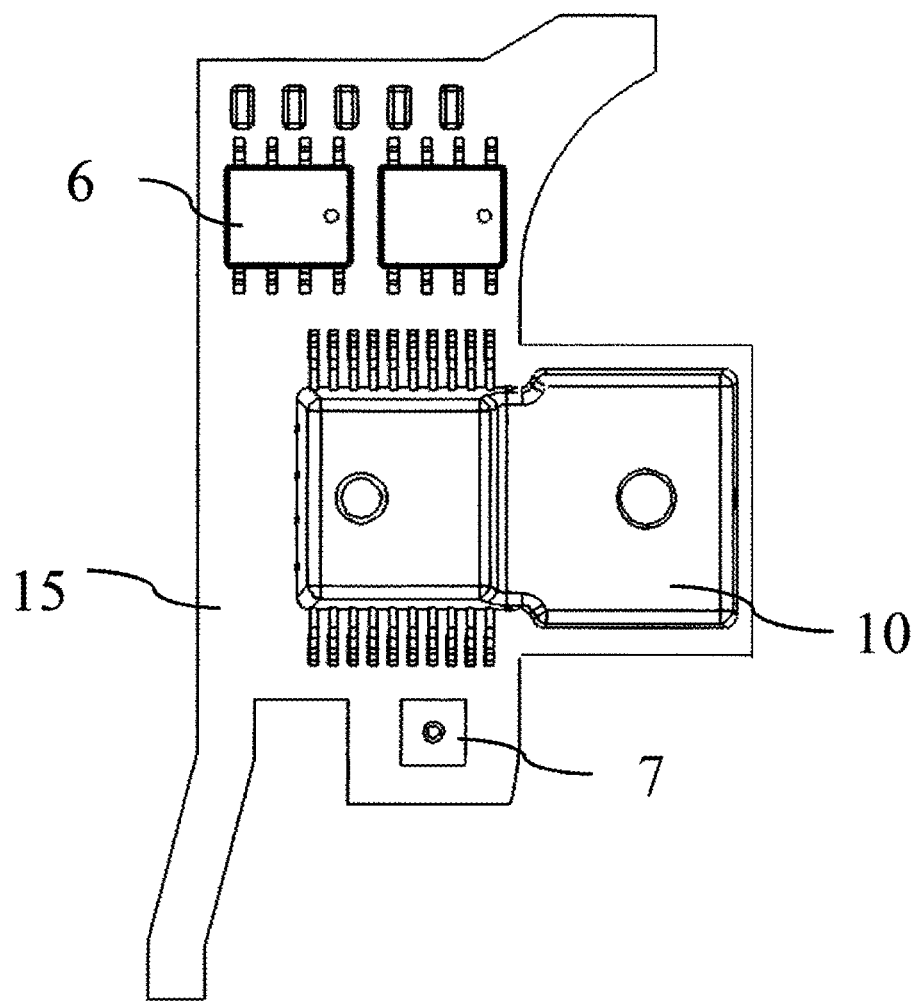
FIG. 3 is a plan view of a circuit board and a sensor assembly according to the first embodiment of the present invention.

As illustrated in FIG. 3, a circuit board assembly in which the sensor assembly 10 is mounted on the circuit board 15 is configured. The sensor assembly 10 having a flow rate detection element 4 for measuring a gas flow rate is mounted on the circuit board 15. The sensor assembly 10 is electrically connected to the circuit board 15, for example, by soldering. In addition to the sensor assembly 10, a pressure sensor 6, a humidity sensor 7, and the like may be mounted on the circuit board 15. By selecting whether or not to mount the pressure sensor 6 and the humidity sensor 7 according to needs, it is possible to provide a flow rate measurement device having various configurations.

In the sensor assembly 10, at least a detection portion of the flow rate detection element 4 is located in the sub-passage 12. The circuit board 15 is formed such that a part thereof is located in the sub-passage 12. The sensor assembly 10 is mounted on the circuit board 15 such that a measurement portion of the flow rate detection element 4 faces a part located in the sub-passage 12 of the circuit board 15.

Figure 4:
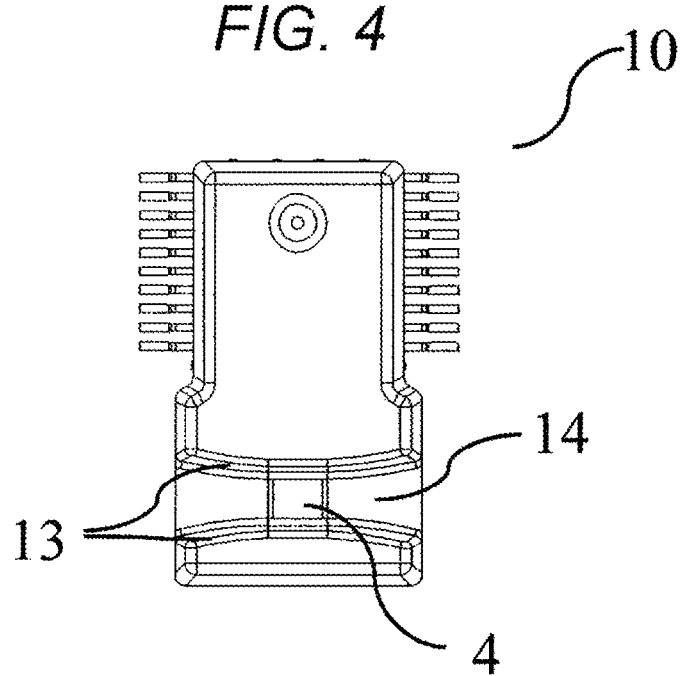
FIG. 4 is a plan view of the sensor assembly according to the first embodiment of the present invention.

As illustrated in FIG. 4, the sensor assembly 10 is a resin package sealed with a resin such that at least a measurement portion of the flow rate detection element 4 is exposed. The flow rate detection element 4 is a semiconductor element formed by a MEMS process, and includes a thin portion (detection unit) in which a heating element is formed. The sensor assembly 10 is a resin package that seals the flow rate detection element 4, an LSI 3, and a lead frame 5 with a resin, and has a structure in which a flow rate detection unit of the flow rate detection element 4 is partially exposed. The sensor assembly 10 has a shape including a recess 14, and the measurement surface of the flow rate detection element 4 is located at a bottom of the recess. The recess has a throttle shape that gradually narrows in a measurement surface direction from end portions toward the flow rate measurement element. By forming the throttle shape with the resin for sealing the flow rate measurement element, a positional relationship between the throttle and the measurement portion can be configured with high accuracy, which is preferable because the measurement accuracy is improved. In addition, as compared with a case of where the air is throttled in a direction perpendicular to the measurement surface, the amount of air containing contaminants guided by the measurement surface is reduced by throttling in a direction parallel to the measurement surface, so that the air is excellent in contamination resistance. Note that the LSI and the flow rate detection element 4 may be integrated with each other, or the LSI may be fixed to the circuit board 15. In addition, the sensor assembly 10 may have a structure in which the flow rate measurement element 4 is mounted on a resin molding (sensor support body) in which a metal terminal is sealed with a resin. The sensor assembly 10 is a support body including at least the flow rate detection element 4 and a member that supports the flow rate detection element.

Figure 5:
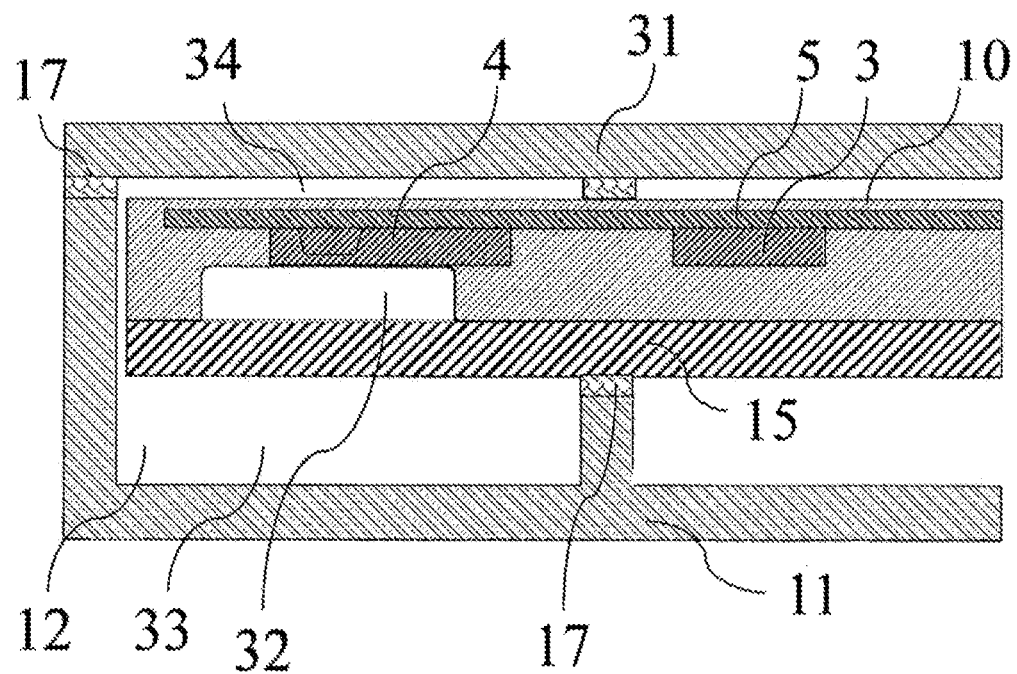
FIG. 5 is a schematic cross-sectional view taken along line A-A of FIG. 2 in the first embodiment according to the present invention.
Figure 6:
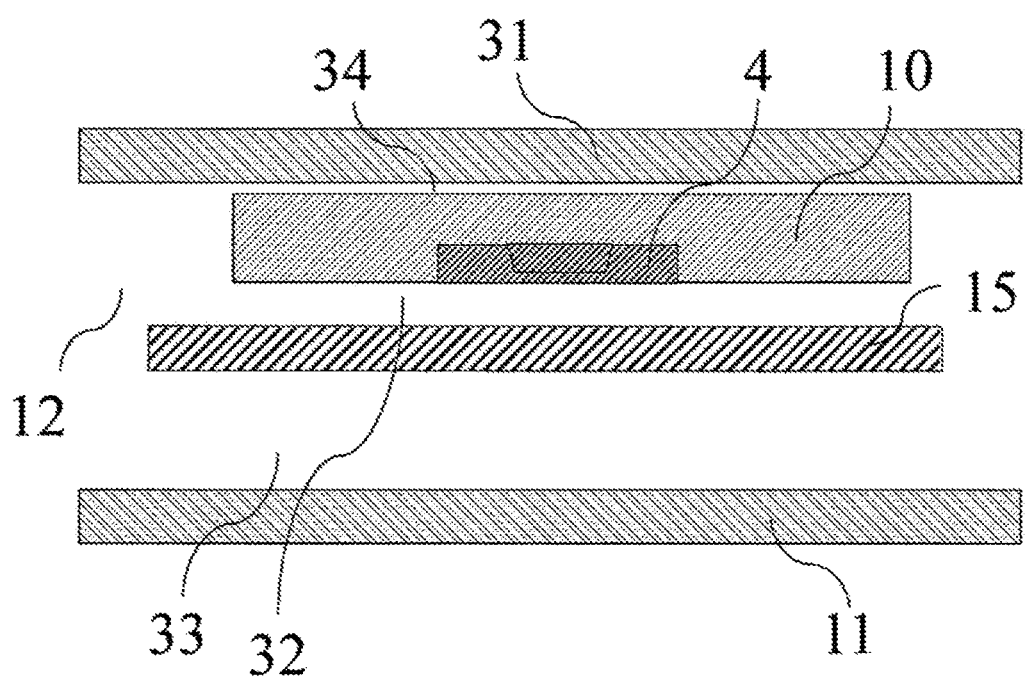
FIG. 6 is a schematic cross-sectional view taken along line B-B of FIG. 2 in the first embodiment according to the present invention.

As illustrated in FIGS. 5 and 6, a first void 32 is formed of one surface of a part of the circuit board 15 located in the sub-passage 12 and one surface of the sensor assembly 10 on the measurement portion side of the flow rate measurement element 4, a second void 33 is formed of the other surface of the part of the circuit board 15 located in the sub-passage 12 and the housing 11, and a third void 34 is formed of the other surface of the sensor assembly 10 and the cover 31.

The first void 32 is first formed by mounting the sensor assembly 10 on the circuit board 15. Thereafter, the circuit board 15 on which the sensor assembly 10 is mounted is mounted on the housing 11 to form the second void 33. Finally, the cover 31 is mounted on the housing 11 to form the third void 34. After the circuit board 15 is mounted on the housing 11 to form the second void 33, the sensor assembly 10 may be mounted on the circuit board 15 to form the first void 32. That is, in the present embodiment, the third void 34 is formed after both the first void 32 and the second void 33 are formed.

A fluid flowing through the sub-passage 12 is divided into a flow path D1 having a measurement surface and a flow path D2 having no measurement surface by the circuit board 15. The first void corresponds to D1 and the second void corresponds to D2.

The dimensional variation of the first void 32 in the thickness direction is affected by the thickness variation of the sensor assembly 10 and a fixing member such as a solder for fixing the sensor assembly 10 to the circuit board.

The dimensional variation of the second void 33 in the thickness direction is affected by the housing 11 and the thickness variation of the adhesive 17 for fixing the circuit board to the housing.

The dimensional variation of the third void 34 in the thickness direction is affected by the thickness variation of the housing 11, the adhesive 17 for fixing the circuit board to the housing, the circuit board 15, the sensor assembly 10, the fixing member such as a solder for fixing the sensor assembly 10 to the circuit board, and the adhesive 17 for bonding the cover 31 and the housing 11 to each other.

By mounting the sensor assembly 10 on the circuit board such that the flow rate measurement element 4 faces the circuit board 15, the variation in the thickness of the circuit board 15 does not affect the variation in the thickness direction of the first void 32. By bonding the housing 11 and the other surface of the circuit board to each other, the variation in the thickness of the circuit board 15 and the variation in the thickness of the sensor assembly 10 do not affect the variation in the thickness direction of the second void 33.

Then, both the first void 32 and the second void 33 are formed, and then the third void 34 is formed (in other words, the third void 33 is located on the upper side than the first void 32 and the second void 33 in a stacking direction. That is, the first void 32 is located between the second void 33 and the third void 34), so that the stacking tolerance variation can be aggregated in the third void 34. The third void 34 formed between the sensor assembly 10 and the cover 31 may be filled with an adhesive or the like. By filling the third void 34, it is possible to suppress the air from flowing into the third void, and thus, it is possible to suppress the influence on the fluid by providing the third void.

In the present embodiment, the third void is formed in addition to the first void and the second void, and the dimensional variation of each member is aggregated in the third void, whereby the dimensional variation of D1 and D2 can be reduced, and the D1 dimension and the flow dividing ratio of D1 and D2 can be configured with high accuracy. Therefore, it is possible to provide an accurate flow rate measurement device.

As a further good example, the third void 34 is smaller than the first void 32 and the second void 33. By reducing the amount of air flowing into the third void, it is possible to suppress the influence of the third void on the fluid flow. The first void 32 is more preferably smaller than the second void 33. Since a large amount of contaminants contained in the fluid flows into the second void 33 side, the amount of contaminants flying to the flow rate measurement element 4 can be reduced, so that the contamination resistance is improved.

Second Embodiment

Figure 7:
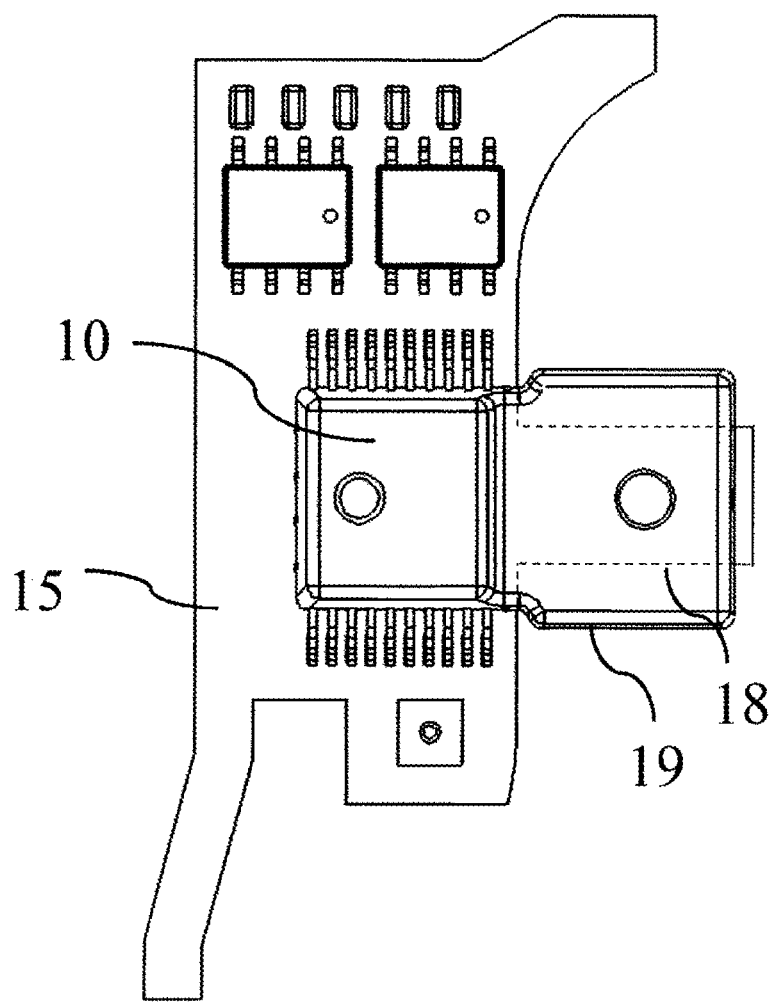
FIG. 7 is a plan view of a circuit board and a sensor assembly according to a second embodiment of the present invention.
Figure 8:
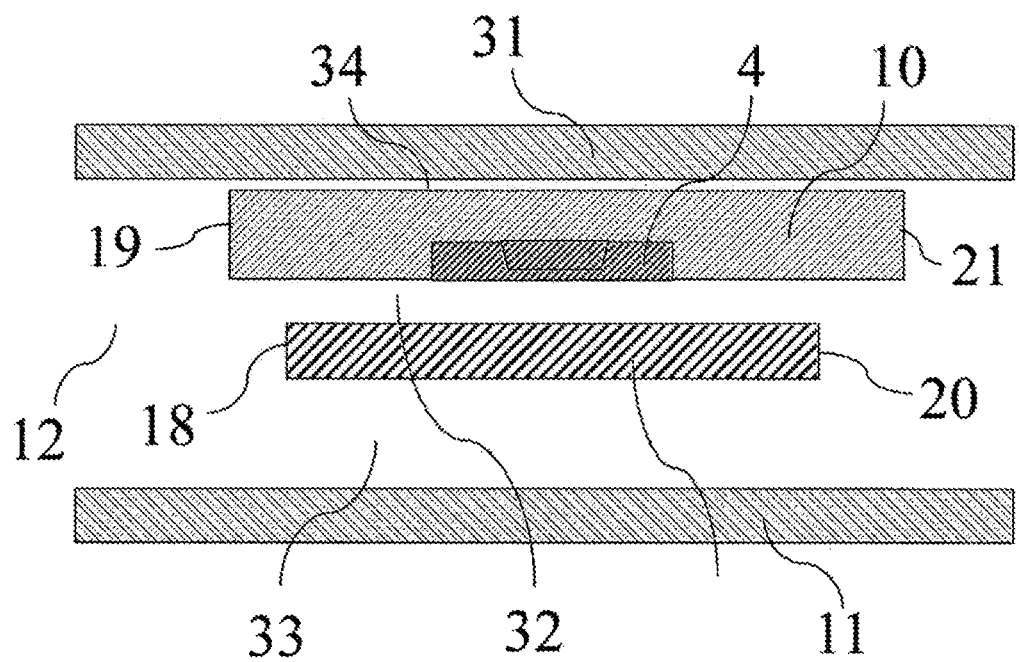
FIG. 8 is a schematic cross-sectional view taken along line B-B of FIG. 2 in the second embodiment according to the present invention.

A second embodiment of the present embodiment will be described with reference to FIGS. 7 and 8. Description of configurations similar to those of the first embodiment will be omitted. In FIG. 7, a part of the end portion of the circuit board 15 that is hidden by the sensor assembly 10 and is not visible is indicated by a broken line.

In the present embodiment, a width (distance in the flow direction of the fluid flowing through the sub-passage 12) of the part of the circuit board 15 located in the sub-passage 12 is formed to be smaller than a width (distance in the flow direction of the fluid flowing through the sub-passage 12) of the part of the sensor assembly 10 located in the sub-passage 12. An upstream end portion 19 of the part of the sensor assembly 10 located in the sub-passage 12 is located on the upstream side from an upstream end portion 18 of the part of the circuit board 15 located in the sub-passage 12.

In the present embodiment, by forming an opening to the third void before the fluid is divided into D1 (the first void 32) and D2 (the second void 33), the flow path having a cross-sectional area larger than D1 and the third void 34 have a dividing relationship, and the dividing resistance of the third void is increased, so that the air flow flowing into the third void can be further suppressed. Therefore, the influence on the fluid by forming the third void can be further suppressed.

As a further preferable example, a downstream end portion 21 of the part located in the sub-passage of the sensor assembly is located on the downstream side from a downstream end portion 20 of the part of the circuit board 15 located in the sub-passage 12, so that the same effect can be obtained on the reverse flow.

Third Embodiment

Figure 9:
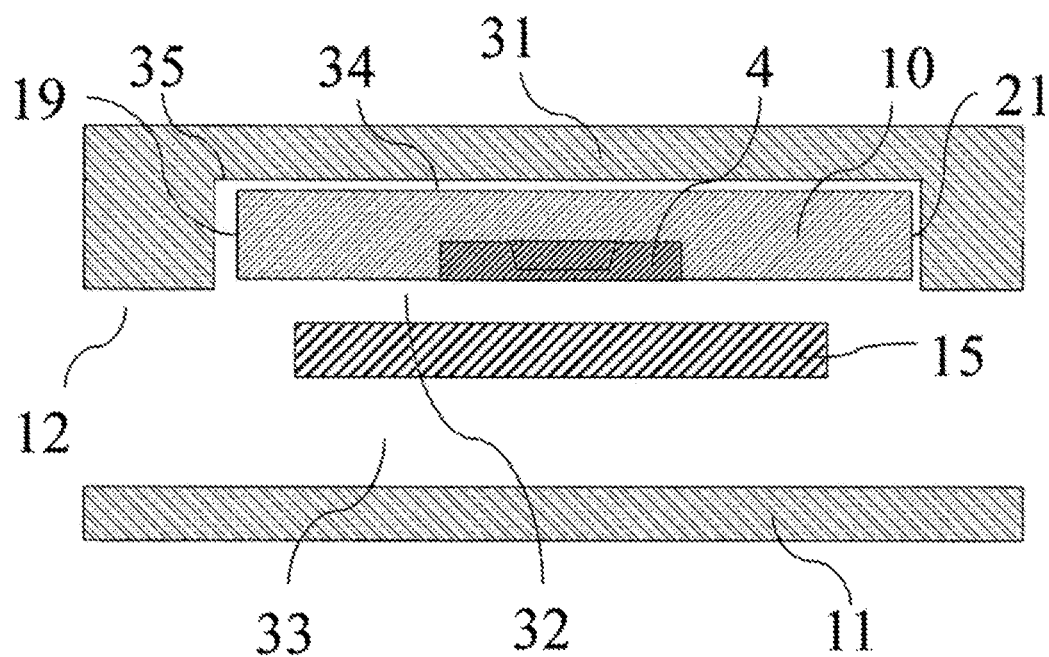
FIG. 9 is a schematic cross-sectional view taken along line B-B of FIG. 2 in a third embodiment according to the present invention.

A third embodiment of the present invention will be described with reference to FIG. 9. The description of the same configuration as that of the previous embodiment will be omitted.

In the present embodiment, a recess 35 is formed in the cover 31, and the flow rate measurement element 4 is formed in the recess 35. In other words, the upstream end portion 19 of the sensor assembly 10 is housed in the recess 35.

According to the present embodiment, since an opening of the third void 34 to the sub-passage 12 is provided to be offset, it is possible to further suppress the fluid flowing through the sub-passage from flowing into the third void 34, and it is possible to further suppress the influence on the fluid by forming the third void.

As a further preferable example, the downstream end portion 21 of the sensor assembly 10 is housed in the recess 35, so that the same effect can be obtained for the reverse flow.

Fourth Embodiment

Figure 10:
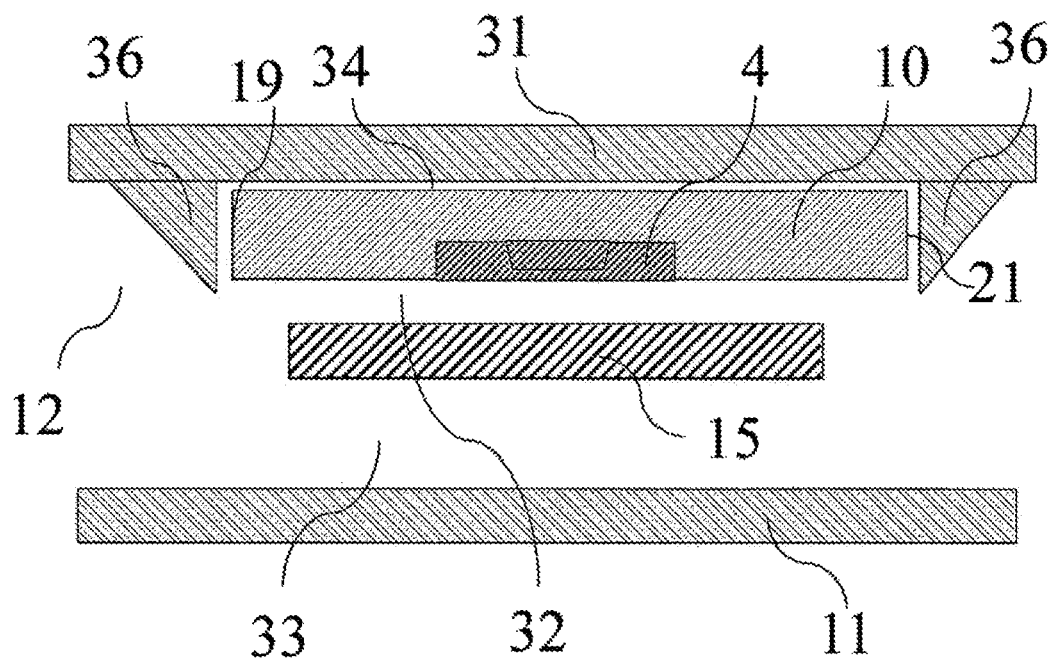
FIG. 10 is a schematic cross-sectional view taken along line B-B of FIG. 2 in a fourth embodiment according to the present invention.

A fourth embodiment of the present invention will be described with reference to FIG. 10. The description of the same configuration as that of the previous embodiment will be omitted.

In the present embodiment, a protrusion 36 is formed on the cover 31 on the upstream side from the upstream end portion 19 of the sensor assembly 10. The protrusion 36 is a shape having an inclination on the upstream side. The upstream end portion 19 of the sensor assembly 10 is located at a position offset toward the cover 31 side from the apex of the protrusion 36. According to the present embodiment, since the fluid is guided to the side opposite to the opening of the third void 34 to the sub-passage 12 by the inclined shape, it is possible to further suppress the fluid from flowing into the third void 34, and it is possible to further suppress the influence on the fluid by forming the third void.

As a further preferable example, the protrusion 36 having an inclination on the downstream side from the downstream end portion 21 of the sensor assembly 10 is formed in the cover 10, and the downstream end portion 21 of the sensor assembly 10 is disposed to be offset toward the cover 31 side from the apex of the protrusion 36, so that a similar effect can be obtained for the reverse flow.

Fifth Embodiment

Figure 11:
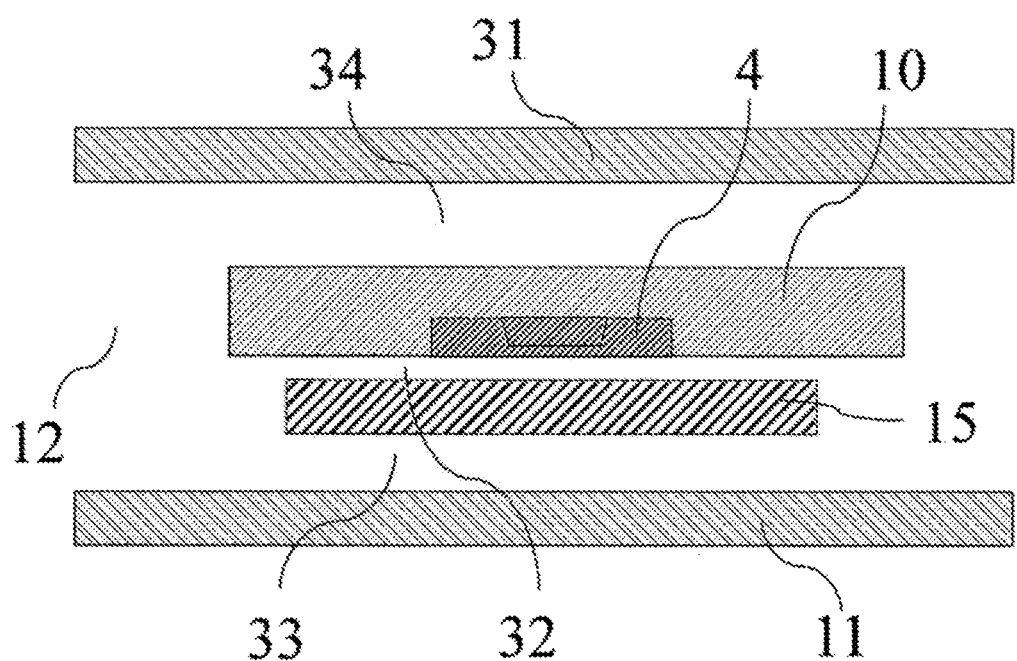
FIG. 11 is a schematic cross-sectional view taken along line B-B of FIG. 2 in a fifth embodiment according to the present invention.

A fifth embodiment of the present invention will be described with reference to FIG. 11. The description of the same configuration as that of the previous embodiment will be omitted.

In the present embodiment, the second void 33 is larger than the first void 32, and the third void 34 is larger than the first void 32. With the configuration in which the flow is actively taken into the third void 34, it is possible to positively flow contaminants into the third void 34 and to improve the contamination resistance.

REFERENCE SIGNS LIST 1 flow rate measurement device
3 LSI
4 flow rate detection element
5 lead frame
6 pressure sensor
7 humidity sensor
10 sensor assembly
11 housing
12 sub-passage
13 throttle shape
14 recess
15 circuit board
17 adhesive
18 upstream end portion
19 upstream end portion
20 downstream end portion
21 downstream end portion
30 fluid
31 cover
32 first void
33 second void
34 third void
35 recess
36 protruding portion

The invention claimed is:

1. A flow rate measurement device including a housing, a cover, and a sub-passage formed of the housing and the cover in a cooperation manner, the flow rate measurement device comprising:
   a circuit board which is mounted on the housing, wherein part of the circuit board is disposed in the sub-passage;
   a support body which is mounted on the circuit board, wherein part of the support body is disposed in the sub-passage;
   a flow rate measurement element which is mounted on the support body, wherein a measurement surface of the flow rate measurement element is disposed in the sub-passage;
   a first void which is formed of from one surface of the support body and one surface of the circuit board, wherein the flow rate measuring element is disposed on the one surface side of the support body so as to face the one surface side of the circuit board;
   a second void which is formed of a surface opposite to the one surface of the circuit board and the housing; and
   a third void which is formed of a surface opposite to the one surface of the support body and the cover, wherein a width of the first void in a thickness direction is smaller than a width of the second void in the thickness direction, and a width of the first void in the thickness direction is larger than a width of the third void in the thickness direction.

2. The flow rate measurement device according to claim 1, wherein the first void is provided between the second void and the third void.

3. The flow rate measurement device according to claim 1, wherein a width of a part of the support body disposed in the sub-passage is formed to be larger than a width of a part of the circuit board disposed in the sub-passage, and an upstream end portion of the part of the support body disposed in the sub-passage is located on an upstream side from an upstream end portion of the part of the circuit board disposed in the sub-passage.

4. The flow rate measurement device according to claim 3, wherein a downstream end portion of the part the support body disposed in the sub-passage is located on a downstream side from a downstream end portion of the part of the circuit board disposed in the sub-passage.

5. The flow rate measurement device according to claim 4, wherein a recess is formed in the cover, and the flow rate measurement element is located in the recess.

6. The flow rate measurement device according to claim 4, wherein a recess is formed in the cover, and an upstream end portion of the support body is located in the recess.

7. The flow rate measurement device according to claim 6, wherein a downstream end portion of the support body is located in the recess.

8. The flow rate measurement device according to claim 1, wherein a protrusion portion having an inclination is formed on the cover, and the measurement surface of the flow rate measurement element is disposed at a position offset toward a cover side from an apex of the protrusion.

9. The flow rate measurement device according to claim 1, wherein the support body is a resin package in which the flow rate measurement element is sealed with a resin, and has a throttle shape formed to be narrowed in a measurement surface direction of the flow rate measurement element.

10. The flow rate measurement device according to claim 1, wherein an adhesive is provided in the third void.

11. A flow rate measurement device including a housing, a cover, and a sub-passage formed of the housing and the cover in a cooperation manner, the flow rate measurement device comprising:

a circuit board which is mounted on the housing, wherein part of the circuit board is disposed in the sub-passage;

a support body which is mounted on the circuit board, wherein part of the support body is disposed in the sub-passage;

a flow rate measurement element which is mounted on the support body, wherein a measurement surface of the flow rate measurement element is disposed in the sub-passage;

a first void which is formed of from one surface of the support body and one surface of the circuit board, wherein the flow rate measuring element is disposed on the one surface side of the support body so as to face the one surface side of the circuit board;

a second void which is formed of a surface opposite to the one surface of the circuit board and the housing; and a third void which is formed of a surface opposite to the one surface of the support body and the cover, wherein a width of the first void in a thickness direction is smaller than a width of the second void in the thickness direction, a width of the first void in the thickness direction is larger than a width of the third void in the thickness direction, a width of the first void in a thickness direction is smaller than a width of the second void in the thickness direction, and a width of the first void in the thickness direction is smaller than a width of the third void in the thickness direction.

* * * * *